United States Patent [19]
Santi et al.

[11] Patent Number: 5,629,392
[45] Date of Patent: May 13, 1997

[54] PROCESS FOR THE PREPARATION OF (CO) POLYMERS OF α-OLEFINS

[75] Inventors: Roberto Santi, Novara; Giuseppe Cometti, Verbania Pallanza; Liliana Gila, Cameriano; Antonio Proto, Novara, all of Italy

[73] Assignee: Enichem S.p.A., Milan, Italy

[21] Appl. No.: 652,821

[22] Filed: May 23, 1996

[30] Foreign Application Priority Data

Jun. 30, 1995 [IT] Italy .................... MI95A1398

[51] Int. Cl.$^6$ .................... C08F 4/64
[52] U.S. Cl. .................... 526/160; 526/161; 526/169; 526/172; 526/352; 502/155
[58] Field of Search .................... 526/161, 169, 526/160, 172, 352

[56] References Cited

U.S. PATENT DOCUMENTS

| | | |
|---|---|---|
| 5,039,766 | 8/1991 | Sasaki et al. .................... 526/161 |
| 5,258,476 | 11/1993 | Sasaki et al. .................... 526/161 |

FOREIGN PATENT DOCUMENTS 271874  6/1988  European Pat. Off. .

OTHER PUBLICATIONS

Calderazzo et al., "Synthesis of N,N–dialkylarbamato Complexes of Group 4 Metals by the Metal Chloride–NHR2–CO2 system:Crystal and Molecular Structure of [Hf(O2CNPr2)4]", J. Chem. Soc. Dalton Trans., pp. 693–398.

*Primary Examiner*—David W. Wu
*Attorney, Agent, or Firm*—Watson Cole Stevens Davis, P.L.L.C.

[57] ABSTRACT

Process for the preparation of (co) polymers of α-olefins which comprises polymerizing at least one α-olefin in the presence of a catalytic system consisting essentially of:

a) a complex of a metal of groups VIB or VB having general formula (I):

$$M(OCONRR')_n \qquad (I)$$

wherein M represents a transition metal selected from the group consisting of Ti, Zr, H& and V; R and R', the same or different, represent a $C_1$–$C_{12}$ aliphatic or $C_{18}$ aromatic radical whereas n represents the oxidation state of the metal; and b) a cocatalyst consisting of aluminoxane.

6 Claims, No Drawings

PROCESS FOR THE PREPARATION OF (CO) POLYMERS OF α-OLEFINS

BACKGROUND OF THE INVENTION

1. Field of the Invention

The present invention relates to a process for the preparation of (co)polymers of α-olefins.

More specifically, the present invention relates to a process for the preparation of polyethylene or copolymers mainly based on ethylene.

2. Discussion of the Prior Art

It is known in literature that ethylene, and α-olefins in general, can be polymerized using soluble complexes of transition metals of group IV combined with an organic oxyderivative of aluminium, generally called aluminoxane.

For example, Die Makromoleculare Chemie Rapid Communications, 12, 663–667 (1991) specifies that the complex $Zr(CH_2Ph)_4$ is active in the polymerization of ethylene, whereas Die Makromoleculare Chemie Rapid Communications, 9(2), 51–55, (1988) indicates that the compound $Ti(O—Bu)_4$ is an efficient catalyst in the polymerization of propylene. These articles, however, do not specify the molecular weights of the polymers obtained nor the MWD (Molecular Weight Distribution).

The U.S. Pat. No. 5.079.205, on the other hand, describes aryloxidic derivatives of metals of group IVB, such as zirconium and hafnium, having general formula $M(OR)_2X_2$ or $M(OR)X_3$, wherein M represents the metal, R a phenoxy group diversely substituted and X a halogen, as catalysts for the preparation of polyethylene having a high molecular weight (Mw of about 300,000–500,000).

The preparation of N,N'-dialkylcarbamates of transition metals of groups IVB and VB is described in Chemische Berichte, 120, 955–964, (1987) and Journal of the Chemical Society Dalton Transactions, 693–698, (1991). These complexes are obtained by the treatment of the chloride of the transition metal with carbon dioxide and an aliphatic amine by means of a simple and convenient synthesis process.

SUMMARY OF THE INVENTION

The Applicant has now found that the above complexes of metals of groups IVB and VB, combined with an organic, oxygenated compound of aluminium, are capable of (co) polymerizing α-olefins giving a polymer with an extremely high molecular weight, for example with a weight average molecular weight Mw of more than 1,000,000.

DETAILED DESCRIPTION OF THE INVENTION

The present invention therefore relates to a process for the preparation of (co)polymers of α-olefins which comprises polymerizing at least one α-olefin in the presence of a catalytic system consisting essentially of:

a) a complex of a metal of groups VIB or VB having general formula (I):

$$M(OCONRR')_n \qquad (I)$$

wherein M represents a transition metal selected from Ti, Zr, Hf and V, R and R' the same or different, represent a $C_1$–$C_{12}$ aliphatic or $C_{18}$ aromatic radical whereas n represents the oxidation state of the metal;

b) a cocatalyst consisting of aluminoxane.

Typical examples of catalysts having general formula (I) which are particularly suitable for the present invention are:

Ti[OCON(i-Pr)$_2$]$_4$;

Zr[OCON(i-Pr)$_2$]$_4$;

H&[OCON(i-Pr)$_2$]$_4$;

Ti[OCON(Et)$_2$]$_4$;

Ti[OCON(i-Pr)$_2$]$_3$;

V[OCON(i-Pr)$_2$]$_3$.

The catalysts having general formula (I) can be used as such or supported on an inorganic solid carrier preferably selected from silica, alumina and magnesium dichloride.

The aluminoxane co-catalyst consists of a mixture which can contain linear or cyclic structures, as well as other optional caged structures. Caged structures are described in Macromolecular Symposia, Vol 97, 1995. The linear structure has the general formula (II):

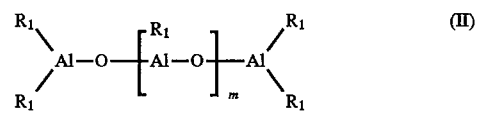

whereas the cyclic structure has general formula (III):

wherein m represents an integer between 1 and 40 and $R_1$ a $C_1$–$C_{20}$, preferably $C_1$–$C_8$, alkyl radical; a $C_6$–$C_{20}$, preferably $C_6$–$C_{12}$, aryl radical; a $C_7$–$C_{20}$, preferably $C_7$–$C_{12}$, arylalkyl or alkylaryl radical; or a $C_3$–$C_{20}$, preferably $C_5$–$C_8$, cycloalkyl radical; or an O—R" radical, wherein R" represents a $C_1$–$C_8$, preferably $C_1$–$C_4$, alkyl radical; a $C_6$–$C_{20}$, preferably $C_6$–$C_{12}$, aryl radical; or a halogen atom, such as chlorine, fluorine or bromine, provided that not all the $R_1$ radicals are contemporaneously O—R" or halogens.

The above co-catalysts, having general formula (II) and (III) are known in literature and described, for example, in published European patent applications 272,584 and 421,659 or in U.S. Pat. No. 4,978,730.

The preferred co-catalyst having general formula (II) and (III) is methylaluminoxane (MAO) with a number average molecular weight (Mn) of between 400 and 2000. The co-catalyst is generally used in such quantities that the molar ratio Al/M is between 10 and 10,000, preferably between 100 and 5000.

According to the process of the present invention, the catalytic system previously described can comprise, in substitution of the aluminoxane, an aluminium alkyl wherein the alkyl group contains from 1 to 6 carbon atoms, for example aluminium trimethyl, aluminium triethyl, aluminium triisobutyl, etc., in such quantities as to give the above molar ratio Al/M.

The term "α-olefins" as used in the present invention and in the claims basically refers to ethylene, propylene, 1-butene, 4-methyl-1-pentene, 1-hexene, 1-octene, etc.

The catalysts of the process of the present invention can be used in processes in suspension at low, medium or high pressure and a temperatures of between 50° and 240° C. Alternatively, they can be used in processes in solution, in the presence of an inert diluent such as toluene, operating at pressures of between 10 and 150 bars and temperatures of between 120° and 230° C. or in processes in gas phase with temperatures generally of between 60° and 90° C. and pressures of between 5 and 50 bars.

The following illustrative examples are provided for a better understanding of the present invention and for its embodiment, but do not limit its scope.

EXAMPLE 1

500 ml of toluene (distillate from metal sodium) and 2.55 ml of a solution of MAO at 10% in toluene (titer of Al=1.57M) are charged into a BUCHI auto-clave, with a 1 litre glass reactor, equipped with a propeller stirrer, thermocouple and heating jacket connected to a thermostat for the temperature control, maintained under vacuum for at least two hours, interrupted by three washings with nitrogen.

The catalyst solution is prepared aside in the following way: 21.4 mg of the complex Ti[OCON(i-Pr)$_2$]$_4$ are dissolved in 50 ml of toluene. 2.2 ml of MAO (ratio Al/Ti=100) are added. 15 ml of the resulting solution, left under stirring at room temperature for 30 minutes, are then added by means of a syringe to the pres-sure-resistant reactor (total ratio Al/Ti=500). The pressure-resistant reactor is pressurized with ethylene and the polymerization is carried out for 30 minutes, the pressure of ethylene being maintained constant for the whole duration of the test (2 atm).

The polymer is recovered by precipitation in acidified methanol and subsequent washings with acetone. 290 mg of polymer are obtained with an activity of 29 g pol/mmol Ti. Weight average molecular weight, Mw, of the polymer:> 1,000,000.

EXAMPLE 2

21.9 mg of Ti[OCON(i—Pr)$_2$]$_4$, dissolved in 50 ml of toluene to which 2.3 ml of the MAO solution (Al/Ti=100) have been added, are maintained under stirring at room temperature for 30 minutes. 13.9 ml of the resulting solution are then added to the pressure-resistant reactor containing the solvent (toluene 500 ml) and the MAO (4.4 ml). The total ratio Al/Ti is 800. The polymerization is carried out at 25° C. for 30 minutes, the pressure being maintained constant at 3 atms. 630 mg of polymer are obtained with an activity of 63 g pol/mmol Ti. Mw>1,500,000.

We claim:

1. Process for the preparation of (co) polymers of α-olefins which comprises polymerizing at least one α-olefin in the presence of a catalytic system consisting essentially of:

a) a complex of a metal of groups VIB or VB having the formula (I):

$$M(OCONRR')_n \qquad (I)$$

wherein M represents a transition metal selected from the group consisting of Ti, Zr, H& and V; R and R', the same or different, represent a C$_1$–C$_{12}$ aliphatic or C$_{18}$ aromatic radical whereas n represents the oxidation state of the metal;

b) a cocatalyst consisting of aluminoxane.

2. Process according to claim 1, wherein the catalysts having formula (I) are:

Ti[OCON(i-Pr)$_2$]$_4$;

Zr[OCON(i-Pr)$_2$]$_4$;

H&[OCON(i-Pr)$_2$]$_4$;

Ti[OCON(Et)$_2$]$_4$;

Ti[OCON(i-Pr)$_2$]$_3$; and

V[OCON(i-Pr)$_2$]$_3$.

3. Process according to claim 1, wherein the catalysts having formula (I) are supported on an inorganic solid carrier.

4. Process according to claim 1, wherein the co-catalyst is methylaluminoxane (MAO) with a number average molecular weight (Mn) of between 400 and 2000.

5. Process according to claim 1, wherein the co-catalyst is used in such quantities that the molar ratio Al/M is between 100 and 10,000.

6. Process according to claim 1, wherein the aluminoxane is substituted with an aluminium alkyl.

* * * * *